US012015758B1

United States Patent
Vondran, Jr. et al.

(10) Patent No.: US 12,015,758 B1
(45) Date of Patent: Jun. 18, 2024

(54) HOLOGRAPHIC VIDEO SESSIONS

(71) Applicant: Apple Inc., Cupertino, CA (US)

(72) Inventors: Gary L. Vondran, Jr., San Carlos, CA (US); Dan C. Lelescu, Morgan Hill, CA (US); Robert K. Molholm, Scotts Valley, CA (US); Nicolas V. Scapel, London (GB); Kathrin Berkner-Cieslicki, Los Altos, CA (US); Seung Wook Kim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 17/539,524

(22) Filed: Dec. 1, 2021

Related U.S. Application Data

(60) Provisional application No. 63/120,157, filed on Dec. 1, 2020.

(51) Int. Cl.
  *H04N 13/279* (2018.01)
  *H04N 13/25* (2018.01)
  *H04N 13/282* (2018.01)
  *H04N 13/31* (2018.01)
  *H04N 13/344* (2018.01)

(52) U.S. Cl.
  CPC .......... *H04N 13/279* (2018.05); *H04N 13/25* (2018.05); *H04N 13/282* (2018.05); *H04N 13/31* (2018.05); *H04N 13/344* (2018.05)

(58) Field of Classification Search
  None
  See application file for complete search history.

(56) References Cited

U.S. PATENT DOCUMENTS

| | | | |
|---|---|---|---|
| 2017/0134746 A1* | 5/2017 | Lawrence | H04N 19/527 |
| 2019/0053012 A1* | 2/2019 | Hill | G06Q 10/04 |
| 2020/0014831 A1* | 1/2020 | Yadav | H04M 1/0264 |
| 2020/0049509 A1* | 2/2020 | Hill | G06Q 30/0259 |
| 2020/0118342 A1* | 4/2020 | Varshney | G06T 13/20 |
| 2020/0184278 A1* | 6/2020 | Zadeh | G06N 3/044 |
| 2020/0266252 A1* | 8/2020 | Cancel Olmo | G06F 3/01 |
| 2021/0075970 A1* | 3/2021 | Jain | G06V 10/25 |
| 2021/0097712 A1* | 4/2021 | Samudrala | G06F 3/017 |
| 2021/0239818 A1* | 8/2021 | Nangou | G01T 1/169 |
| 2022/0138965 A1* | 5/2022 | Canetti | G06T 7/246 382/103 |
| 2022/0351751 A1* | 11/2022 | Ocean | H04N 17/002 |

* cited by examiner

*Primary Examiner* — Talha M Nawaz
(74) *Attorney, Agent, or Firm* — Thompson Hine LLP

(57) ABSTRACT

Various implementations disclosed herein include devices, systems, and methods that provide images for displaying a 3D appearance of a tracked object on a view dependent device. In some implementations, a set of multiple images of the object from different capture positions is provided and then adjusted such as to render the object in focus when using the adjusted images for display on the view dependent device. In some implementations, the set of multiple images is provided that includes virtual images generated using virtual image sensors that may improve the appearance of out of focus regions (e.g., outside the 3D object appearance) on the view dependent device. In some implementations, the set of multiple images of a person provides a hologram of the person (e.g., left and right eye views provide the appearance of a 3D person) where the images are adjusted to improve gaze direction of eyes of the person.

20 Claims, 16 Drawing Sheets

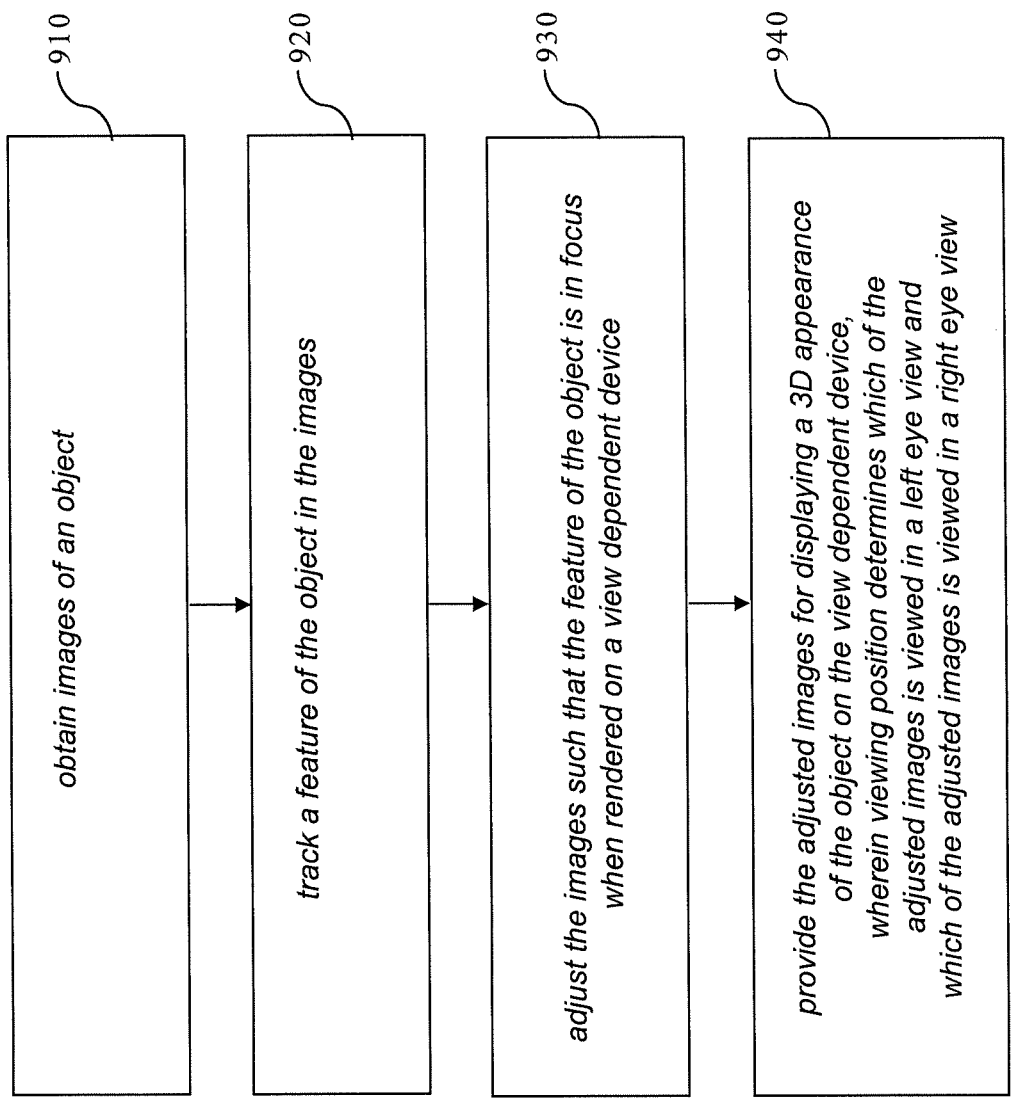

HOLOGRAPHIC VIDEO SESSIONS

CROSS-REFERENCE TO RELATED APPLICATIONS

This application claims the benefit of U.S. Provisional Application Ser. No. 63/120,157 filed Dec. 1, 2020, which is incorporated herein in its entirety.

TECHNICAL FIELD

The present disclosure generally relates to providing images for displaying a holographic appearance of an object on a view dependent device to a user of an electronic device and, in particular, to systems, methods, and devices that provide sets of multiple images of the object from different capture positions.

BACKGROUND

Audio and video telephone calls are implemented between two or more electronic devices. However, there exists a need for real time holographic video devices, systems, and methods and other interactive holographic experiences.

SUMMARY

Various implementations disclosed herein include devices, systems, and methods that provide sets of multiple images for displaying a 3D appearance of a tracked object on a view dependent device. In some implementations, a set of multiple images of the object from different capture positions is provided and then adjusted to cause the object to be in focus when rendered using the adjusted images on the view dependent device. In some implementations, the set of multiple images is provided where some of the images are virtual images generated using virtual image sensors (e.g., synthetic apertures). In some implementations, using additional virtual image sensors improve the appearance of out of focus regions (e.g., outside the 3D object appearance) on the view dependent device. In some implementations, the set of multiple images of a person provides a hologram of the person (e.g., left and right eye views that give the appearance of a 3D person) where the images are adjusted to improve gaze direction of eyes of the person. In some implementations, exemplary holographic real-time video systems provide sets of multiple images of an object from different capture positions for display on a view dependent device.

In some implementations, a method includes obtaining images of an object and tracking a feature of the object in the images. In some implementations, the images are adjusted such that the feature of the object is in focus when rendered on a view dependent device. Then, the adjusted images are provided for displaying a three-dimensional (3D) appearance of the object on the view dependent device, wherein viewing position determines which pixels of the adjusted images are viewed in a left eye view and which pixels of the adjusted images are viewed in a right eye view.

In some implementations, a method includes obtaining captured images of an object from one or more cameras and generating virtual images of the object using the captured images. Then, the captured images and virtual images are provided for displaying a 3D appearance of the object on a view dependent device, wherein viewing position determines which pixels of the captured images and virtual images are viewed in a left eye view and which pixels of the captured images and virtual images are viewed in a right eye view.

In some implementations, a method includes obtaining images of a person and adjusting the images to change an appearance of a gaze direction of an eye of the person in at least some of the images. Then, the adjusted images are provided for displaying a three-dimensional (3D) appearance of the object on a view dependent device, wherein viewing position determines which pixels of the adjusted images are viewed in a left eye view and which pixels of the adjusted images are viewed in a right eye view.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 9 is a flowchart illustrating an exemplary method of providing images for displaying a 3D appearance of a tracked object on a view dependent device in accordance with some implementations.

Figure 1:
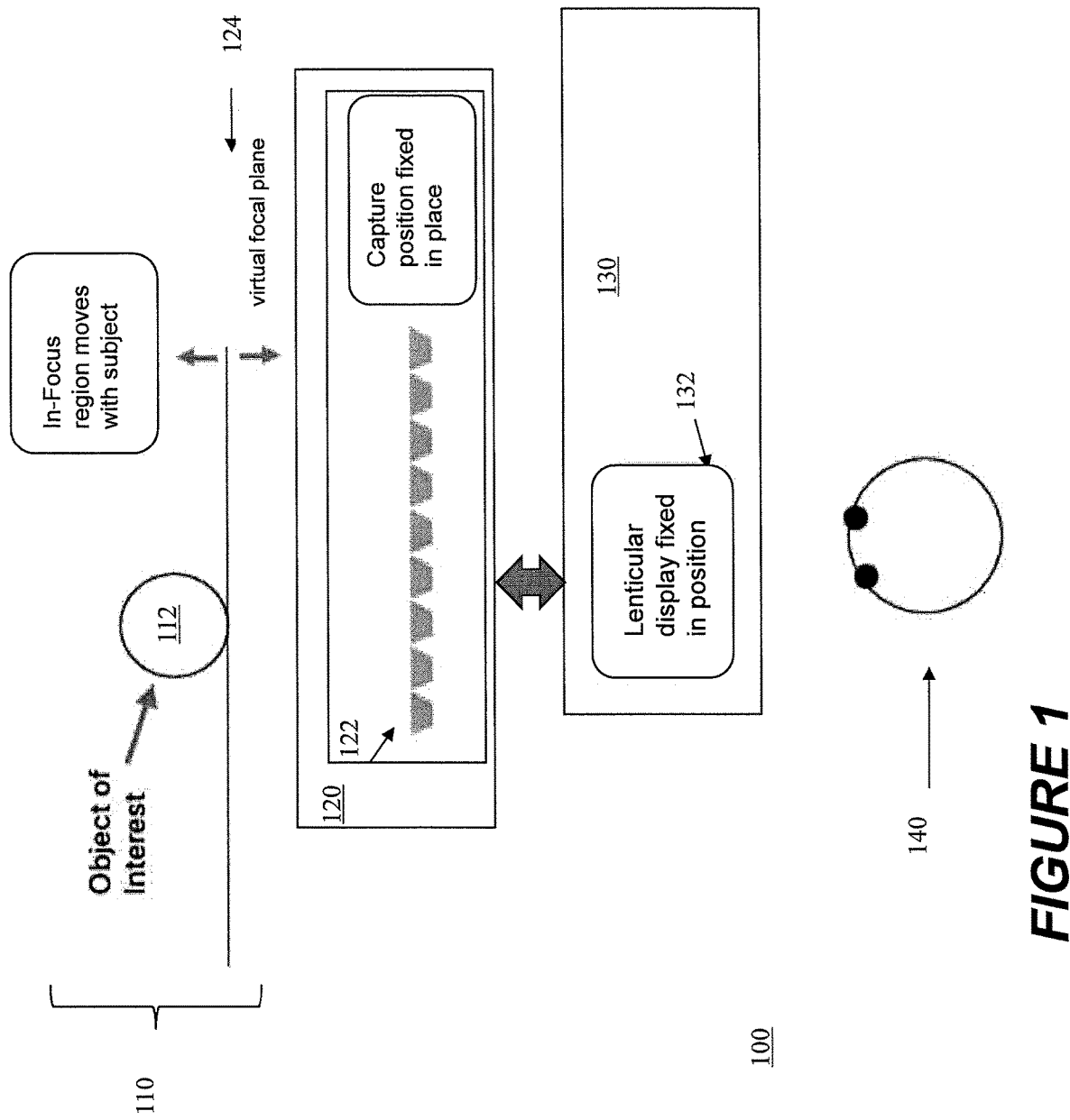
FIGS. 1-3 are diagrams that illustrate an exemplary holographic real-time video communication system in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that implement holographic real-time video communications. In some implementations, a holographic video call in implemented between two or more electronic devices including image sensors and view dependent display devices.

Various implementations disclosed herein include devices, systems, and methods that capture, encode (e.g., format), transmit, decode (e.g., unpack), and display holographic data for a view dependent device that represents a set of multiple images of an object in a physical environment from different capture positions. In some implementations, the view dependent device is a light field display, a HMD, an autostereoscopic display, or the like. In one example, the view dependent device is a 1D lenticular display (e.g., a type of light field display) that allows parallax in a first direction, wherein the 1D lenticular display concurrently displays each of the set of multiple images such that each eye of the viewer views a different one of the set of multiple images depending upon the viewer's position along the first direction. In another example, the view dependent device is a HMD that respectively displays an appropriate image of the set of multiple images in a right eye display and a left eye display of the HMD based on a viewer/HMD pose.

Figure 2:
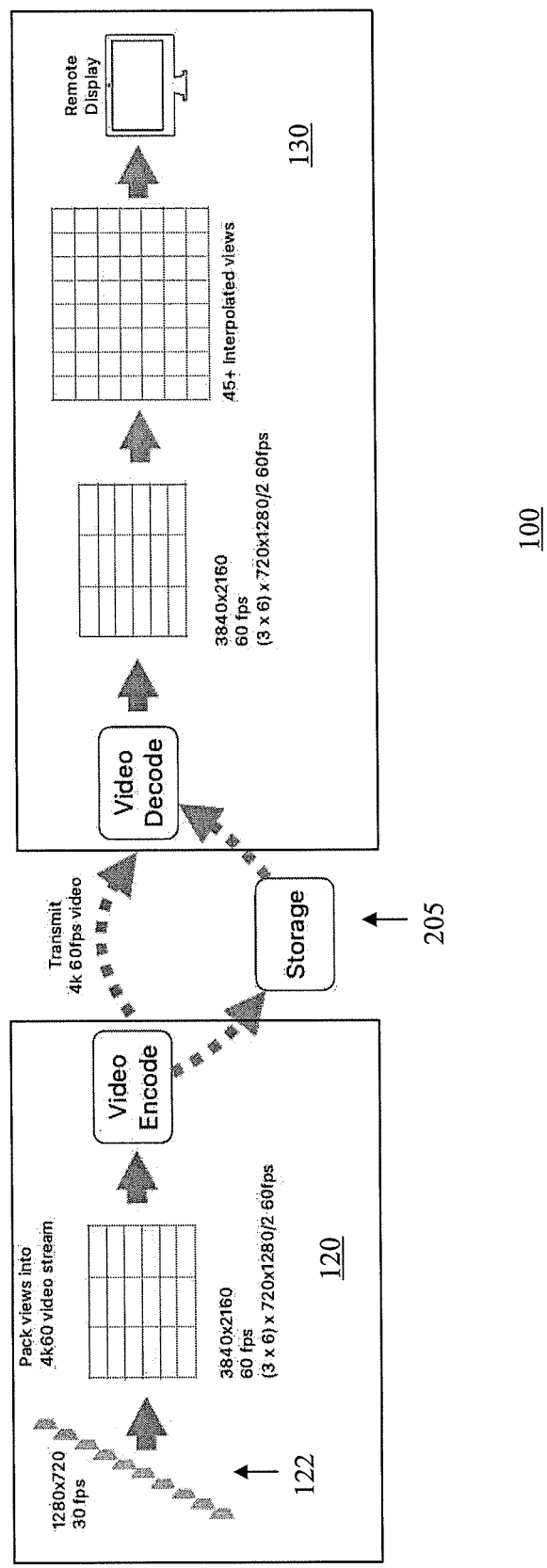
Figure 3:
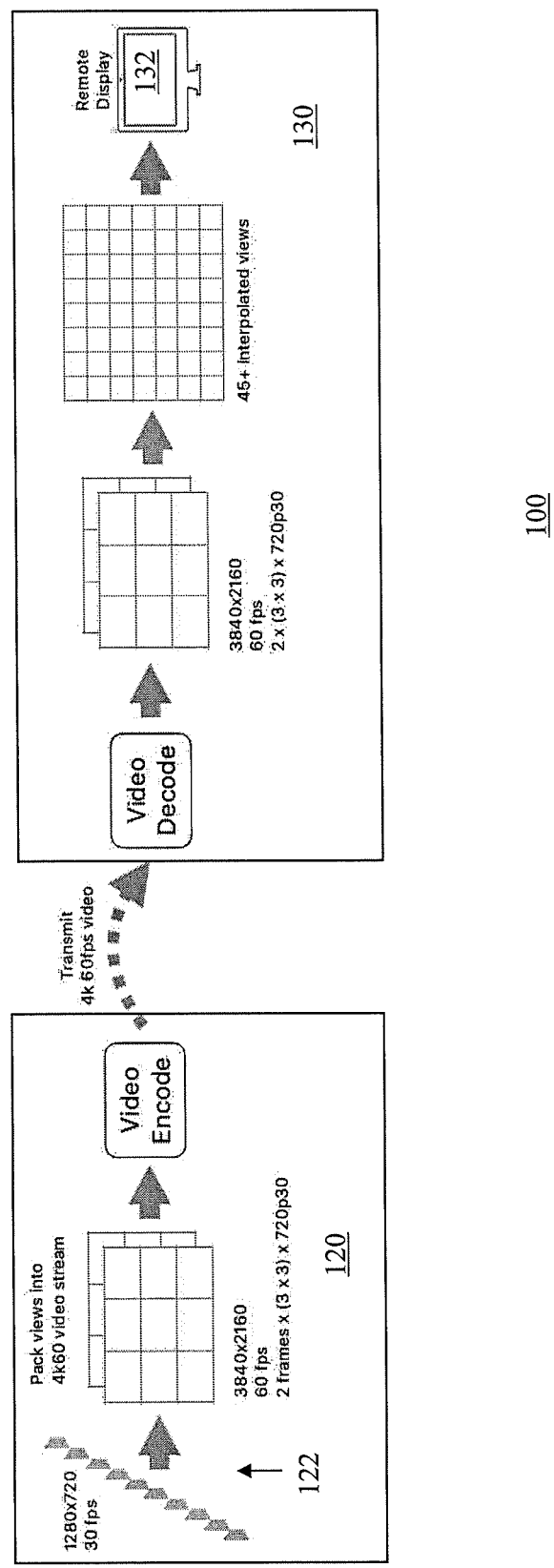

FIGS. 1-3 illustrate an exemplary holographic real-time video communication system in accordance with some implementations. As shown in FIGS. 1-3, a holographic real-time video communication system 100 includes a holographic image data capture system 120 including a plurality of image sensors 122 in communication with a holographic video display system 130 including a view dependent display, which may be a 1D lenticular display 132. In some implementations, the plurality of image sensors 122 have a prescribed spatial arrangement. In some implementations, the plurality of image sensors 122 include a 1D array of image sensors. In some implementations, the plurality of image sensors 122 include a 2D/3D array of image sensors. For example, the image sensors 122 may be conventional image cameras (e.g., RGB cameras).

The plurality of image sensors 122 capture images of a physical environment 110 including an object of interest 112. As shown in FIG. 1, the object 112 is tracked in the physical environment 110 and a virtual focal plane 124 corresponding to the adjustment of the images captured by the plurality of image sensors 122 is manipulated to correspond to the object 112 in the physical environment 110. In some implementations, one or more features of the object 112 is tracked in the physical environment 110 and the virtual focal plane 124 corresponding to the adjusted images obtained from the plurality of image sensors 122, is manipulated to correspond to the one or more features of the object 112 in the physical environment 110. The virtual focal plane 124 is an attribute obtained by manipulation of the images captured by the plurality of image sensors 122 (e.g., physical image sensors or virtual image sensors) such that the features of interest in the physical environment 110 (e.g., the object 112) on that virtual focal plane 124 are aligned in the adjusted images (e.g., shifted/interpolated), which then results in those features of interest being displayed in focus on the view dependent device (e.g., 1D lenticular display 132) on the plane of zero-parallax for the display rendering volume. In some implementations, the virtual focal plane 124 is determined by adjusting the captured images by trial and error (e.g., manually, semi-automatically) to bring one or more features of interest in the physical environment 110 to be in focus on the view dependent display. In other implementations, the virtual focal plane 124 is determined by computing the depth to the feature of interest (e.g., from the images captured by the image sensor(s)), which is then combined with knowledge of view dependent display characteristics (e.g., lens pitch) to adjust the images such that the feature of interest is rendered in focus on the view dependent display.

In some implementations, a separate tracking system in the holographic image data capture system 120 is used to track the object 112 in the physical environment 110. In other implementations, image processing of the images captured by the plurality of image sensors 122 are used to track the object 112 or a feature of the object 112.

As shown in FIG. 2, the system 100 captures, encodes (e.g., format), transmits, and decodes (e.g., unpack) holographic image data to display holographic real-time video using the lenticular display 132 (e.g., a view dependent display device). In some implementations, the holographic image data from the plurality of image sensors 122 is encoded by the holographic image data capture system 120 into a standard data format. The system 100 uses the 1D lenticular display 132 that concurrently displays a plurality of images of the object 112 along a parallax direction to provide the holographic appearance of the object 112 in the physical environment 110. In one example, the holographic image data from the plurality of image sensors 122 may be encoded into a standard 4k 60 frames per second (fps) video stream that includes a plurality of left eye and right eye views of the object 112. As shown in FIG. 2, the encoded holographic image data includes sets of multiple views from different capture positions of the object 112 along the parallax direction of the 1D lenticular display 132 in the video stream for concurrent display. In some implementations, a different view is provided for each one degree of movement along the parallax direction. In some implementations, spatialized audio (e.g., stereo audio, surround sound audio) is captured corresponding to each of the positions of the plurality of image sensors 122

Thus, as shown in FIG. 1, a viewer 140 of the holographic video display system 130 is able to move with 6 degrees of freedom and still see a holographic video stream of the object 112. In some implementations, the viewer 140 using the 1D lenticular display 132 is able to move with 6 degrees of freedom and still see a holographic video stream of the object 112 in 3D (e.g., stereo), but will observe parallax change in only one direction (e.g., horizontal). In some implementations, based on a pose of the viewer 140 relative to the parallax direction of the 1D lenticular display 132, a single image of the plurality of concurrently displayable images of the object 112 (e.g., physical environment 110) on the 1D lenticular display 132 is viewed by the left eye and a different single image of the plurality of concurrently different displayable images of the object 112 on the lenticular display 132 is viewed by the right eye of the viewer 140 to provide the holographic video for the viewer 140. In some implementations, pixels from a few input images (e.g., more than 1) of the plurality of concurrently displayable images of the object 112 contribute to each of the left and right eye views of the viewer 140 to provide the holographic video for the viewer 140. For example, pixels from a few input images can contribute to each of the left and right eye views of the viewer 140 because of cross talk of pixels from multiple views (e.g., images) under each lenticule, which can benefit smoothing the transition between views as the head of the viewer 140 moves. In some implementations, spatialized audio (e.g., stereo audio, surround sound audio, etc.) is captured corresponding to each of the positions of the plurality of image sensors 122 and matching spatialized audio corresponding to a viewing position of the viewer 140 is generated using the captured spatialized audio and the viewing position (e.g., to provide audio that matches the view).

In alternative implementations, the plurality of image sensors 122 is a 2-dimensional array, and a corresponding view dependent device in the holographic video display system 130 is a more general light field display that includes 2D lenticular with corresponding display pixels (e.g., underneath) that enable parallax viewing of the general light field display in any direction. As described herein, the 1D lenticular display 132 includes lenticular, which allow parallax in the horizontal direction (e.g., only one direction).

In some implementations, the holographic image data from the plurality of image sensors 122 in the holographic image data capture system 120 is directly transmitted to the holographic video display system 130 as a live or broadcast event. Alternatively, the holographic image data from the plurality of image sensors 122 in the holographic image data capture system 120 may be stored for playback at the holographic video display system 130 at a later time. As shown in FIG. 2, the holographic image data from the plurality of image sensors 122 in the holographic image data capture system 120 is transmitted to storage 205 for later transmission to the holographic video display system 130.

FIG. 3 illustrates another exemplary formatting, transmitting, and decoding of holographic image data using a standard video format to display holographic real-time video using a lenticular display in accordance with some implementations. As shown in FIG. 3, the holographic image data from the plurality of image sensors 122 may be encoded into a standard 4k 60 fps video stream that includes multiple views (e.g., 45 left eye or right eye views) of the object 112 for concurrent display in the video stream at the holographic video display system 130 (e.g., the 1D lenticular display 132).

The 1D lenticular display 132 includes its own focal plane that provides the "in-focus" area of the images concurrently displayed by the lenticular display 132. In some implementations, the display focal plane of the lenticular display 132 includes (e.g., is aligned to) the virtual focal plane 124 when the adjusted images are displayed. In some implementations, the 1D lenticular display 132 has a limited or shallow depth of field (DOF) that can cause a single focal plane to be in focus on the 1D lenticular display 132.

In some implementations, the system 100 provides images for displaying a 3D appearance of a tracked object on a view dependent device. In some implementations, a set of multiple images of the object 112 from different capture positions is provided and then adjusted so that a feature of the object 112 (e.g., a facial feature of a person's head) is in focus when rendered on the view dependent device. In one example, the set of multiple images of the object 112 from different capture positions of the plurality of image sensors 122 is adjusted by aligning the virtual focal plane 124 to the object 112 or a feature of the object 112. The system 110 aligns the object 112 with the virtual focal plane 124 in the adjusted images because very little of the physical environment 110 is in focus or in the DOF of the lenticular display 132 when the adjusted images are rendered. In one implementation, image processing calculations of input images of the plurality of image sensors 122 are used to track the object 112 and ensure the object 112 is always in focus (e.g., aligned with the virtual focal plane 124 in the adjusted images). In some implementations, the set of multiple images of the object 112 from different capture positions are adjusted so that the object 112 is in focus when the adjusted images are rendered on the view dependent device. In some implementations, the adjusted images rendered on the view dependent device include captured image data that have been modified or adjusted to bring into focus different objects in the scene (e.g., physical environment 110) when that image data is displayed using the adjusted images (e.g., left and right eye views) on the lenticular display. For example, the physical characteristics (e.g., focus) of the plurality of image sensors 122 are not adjusted, but the captured image data (e.g., pixel data) of the plurality of image sensors 122 is adjusted. In some implementations, adjusting the virtual focal plane 124 to the object 112, where the virtual focal plane 124 is then matched to the display focal plane of the lenticular display 132 mitigates the small DOF limitation of the lenticular display 132.

In some implementations, the system 100 is able to track multiple objects of interest and then switch from one object of interest to another object of interest in the captured images. However, holographic real-time video may only be provided by the system 100 for a single object of interest at a time.

Figure 4:
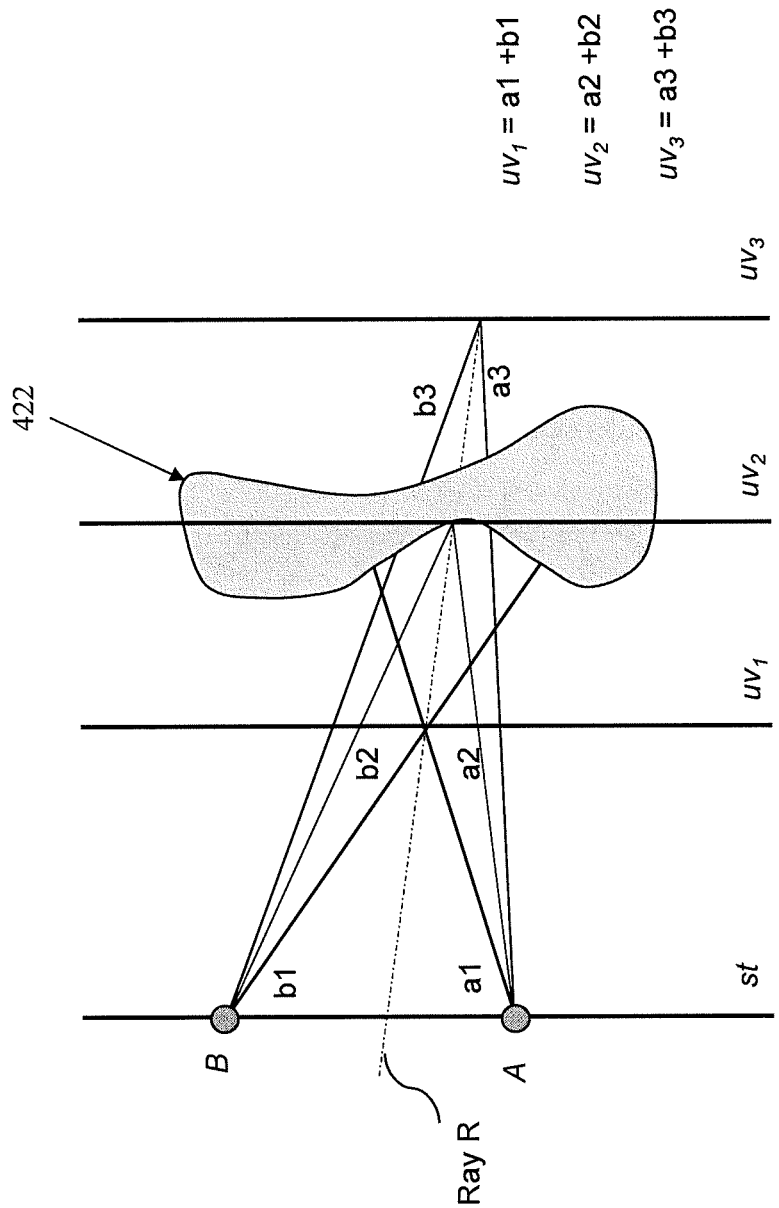
FIG. 4 illustrates an exemplary plane that causes an object of interest in a physical environment to be rendered in focus on a view dependent display in accordance with some implementations.

FIG. 4 illustrates an exemplary plane that causes an object of interest in a physical environment to be rendered in focus on a view dependent display in accordance with some implementations. As shown in FIG. 4, two adjacent image sensors A, B of the plurality of image sensors 122 capture an object of interest 422 in an image of a physical environment 410. Three (3) vertical lines $uv_1$, $uv_2$, $uv_3$ shown in FIG. 4 represent virtual focal planes placed in the environment 410 at different distances from the adjacent image sensors A, B. As shown in FIG. 4, the only position that will render perfectly in focus is the dotted line labeled Ray R that crosses the object 422 where the ray b2 points to the same position as the ray a2, and the virtual focal plane that will render in focus is middle plane $uv_2$. In some implementations, lenticular displays can playback one focal plane in focus at a time. In some implementations, virtual image sensors (e.g., see FIG. 5, synthetic aperture image sensors 122b) also can have only a single virtual focal plane. Accordingly, the lenticular displays and the virtual image sensors can both have a shallow DOF, although there can be differences between the size of the respective DOFs (e.g., based on additional parameters of the lenticular display or virtual image sensor (e.g., aperture size).

Figure 5A:
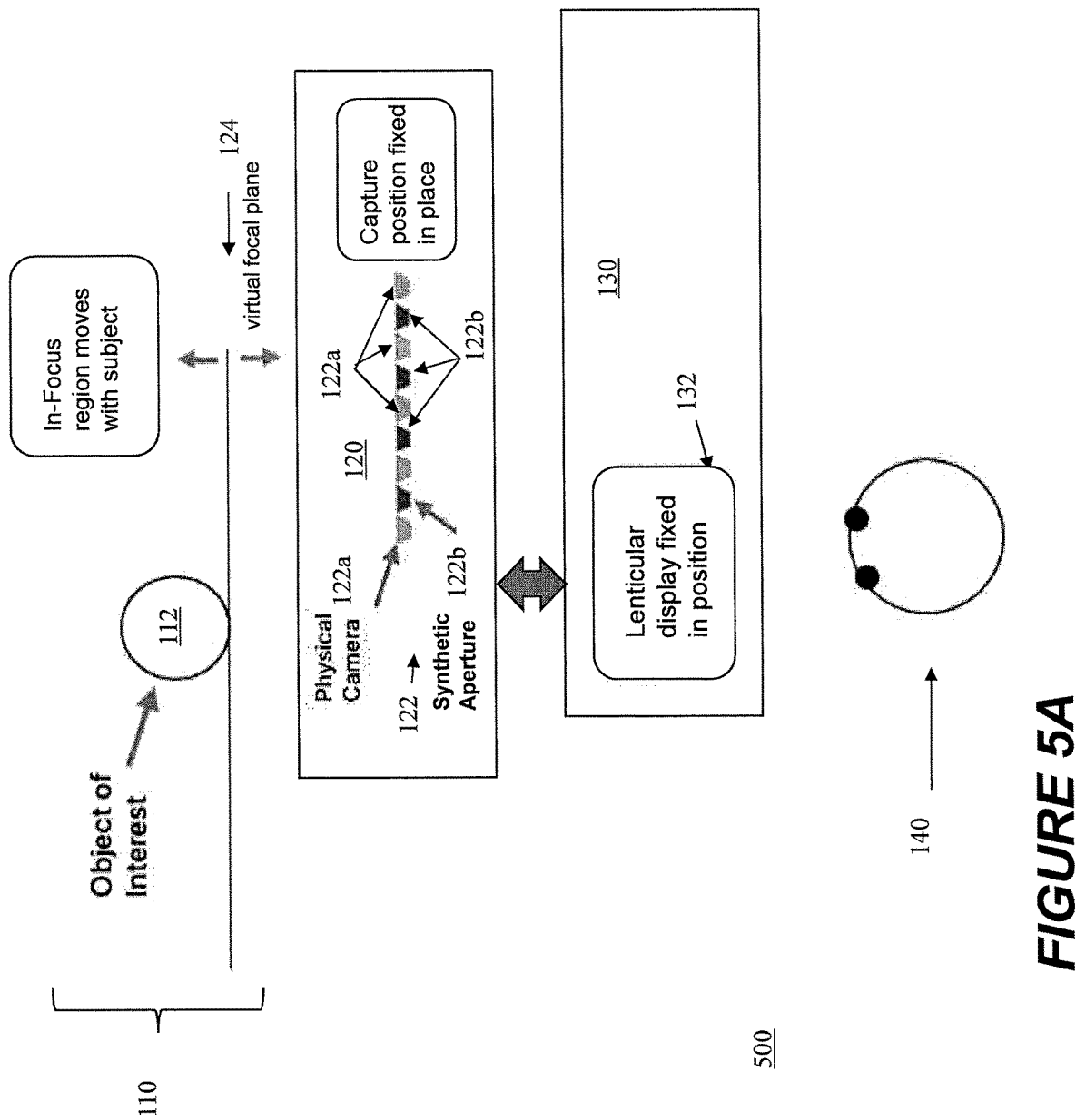
FIGS. 5A-5B illustrate an exemplary holographic real-time video communication system that provides sets of multiple images of an object from different capture positions where some of the images are virtual images generated using virtual image sensors in accordance with some implementations.
Figure 5B:
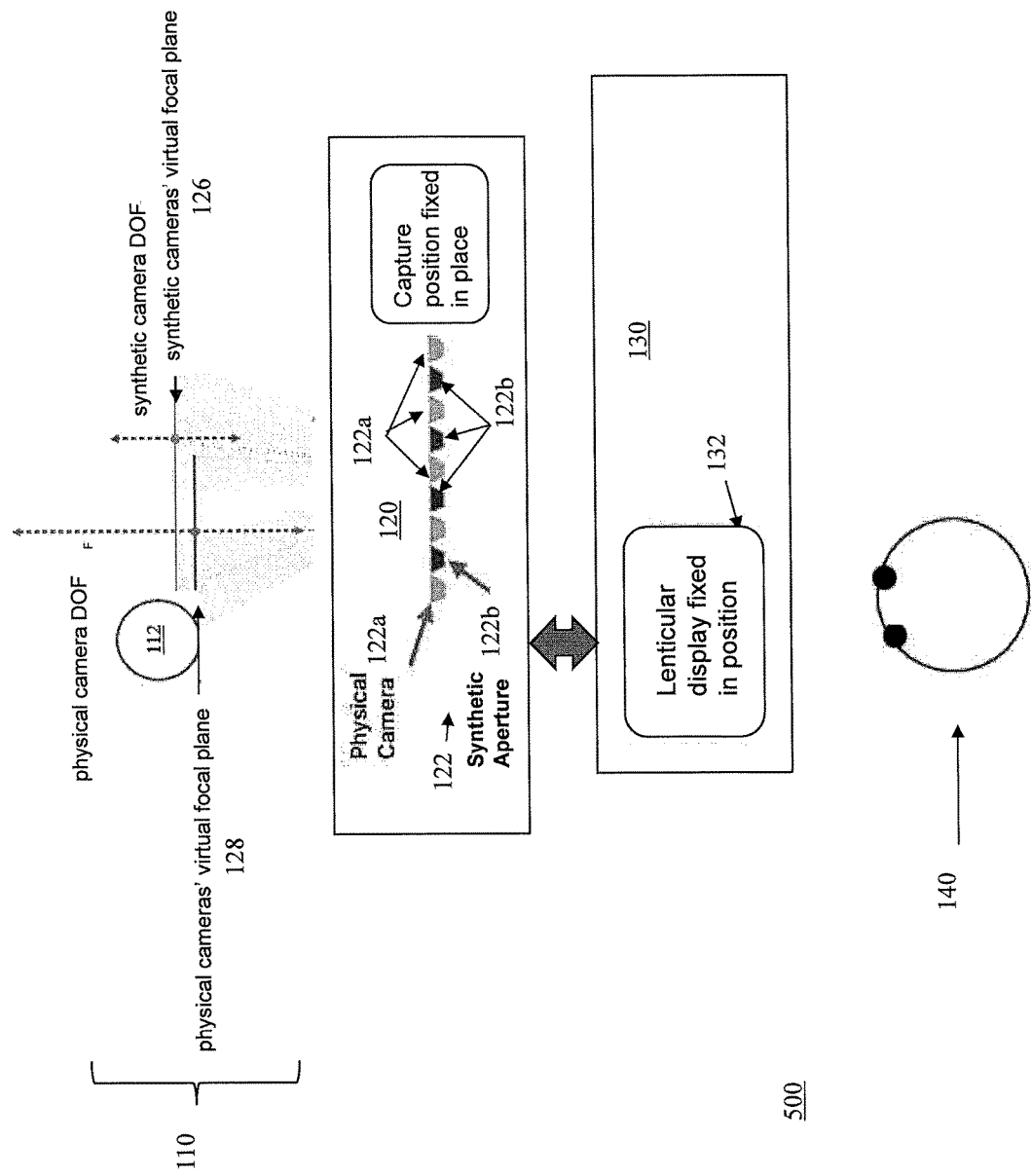

FIGS. 5A-5B illustrate an exemplary holographic real-time video communication system that provides a set of multiple images of an object from different capture positions where some of the images are virtual images generated using virtual image sensors (e.g., synthetic apertures) in accordance with some implementations. In some implementations, the set of multiple images including virtual images of the object are used to display a holographic appearance of the object on a view dependent device (e.g., left and right eye views of the object that give the appearance of a 3D object). As shown in FIG. 5A-5B, providing additional virtual images generated using synthetic apertures increases a number of images in the set of multiple images of the object or increases a number of image sensors 122 (e.g., the images sensors may be more dense). In some implementations, the additional virtual images of the object from the virtual image sensors improve an appearance of out of focus regions of the set of multiple images of the object from different capture positions when displayed on the view dependent device.

As shown in FIGS. 5A-5B, the plurality of image sensors 122 includes a plurality of physical image sensors 122a and a plurality of additional synthetic aperture image sensors 122b based on the physical image sensors 122a in a holographic real-time video communication system 500. As shown in FIG. 5A, the plurality of physical image sensors 122a and the plurality of additional synthetic aperture image sensors 122b share the same virtual focal plane 124. In some implementations, the synthetic apertures are generated using light field synthetic aperture techniques. For example, additional synthetic apertures may be generated utilizing the light field parametrization to create virtual cameras in space, whose apertures are sampled by neighboring cameras. In some implementations, the synthetic apertures are generated using machine learning techniques to generate desired spatially related views with respect to a spatial arrangement of a plurality of physical image sensors. As shown in FIG. 5A-5B, an example of the plurality of image sensors 122 includes a 1D array of N physical image sensors 122a and a 1D array of N−1 synthetic aperture image sensors 122b in between.

In some implementations, the plurality of additional synthetic aperture image sensors 122b need not have a DOF much greater than or equal to the DOF for the view dependent display (e.g., the lenticular display 132). In some implementations, the DOF of the plurality of additional synthetic aperture image sensors 122b is shallow and their respective virtual focal planes are also constantly computed (e.g., updated) to track an object (e.g., one or more features of the object 112) so that the respective virtual focal planes constantly follow the object movement in depth in the scene (e.g., physical environment 110), which can reduce or eliminate blur when pixels of the plurality of additional synthetic aperture image sensors 122b are rendered or played back in addition to pixels of physical cameras (e.g., physical image sensors 122a). In some implementations, the limited DOF for the plurality of additional synthetic aperture image sensors 122b reduces computational processing requirements to calculate or generate images from the plurality of additional synthetic aperture image sensors 122b.

As shown in FIG. 5B, the example of the plurality of physical image sensors 122a use a focal plane 128 and the plurality of additional synthetic aperture image sensors 122b use a slightly different virtual focal plane 126. As shown in FIG. 5B, in some implementations the plurality of additional synthetic aperture image sensors 122b have a DOF that is less than the DOF of the plurality of physical image sensors 122a. In some implementations, the use of the virtual focal plane 126 may improve an appearance of portions of the displayed images outside the object 112 (e.g., in the set of multiple images of the object 112 from different capture positions). In some implementations, a DOF of one or more of the plurality of additional synthetic aperture image sensors 122b uses a DOF different from the other synthetic aperture image sensors 122b.

Figure 6:
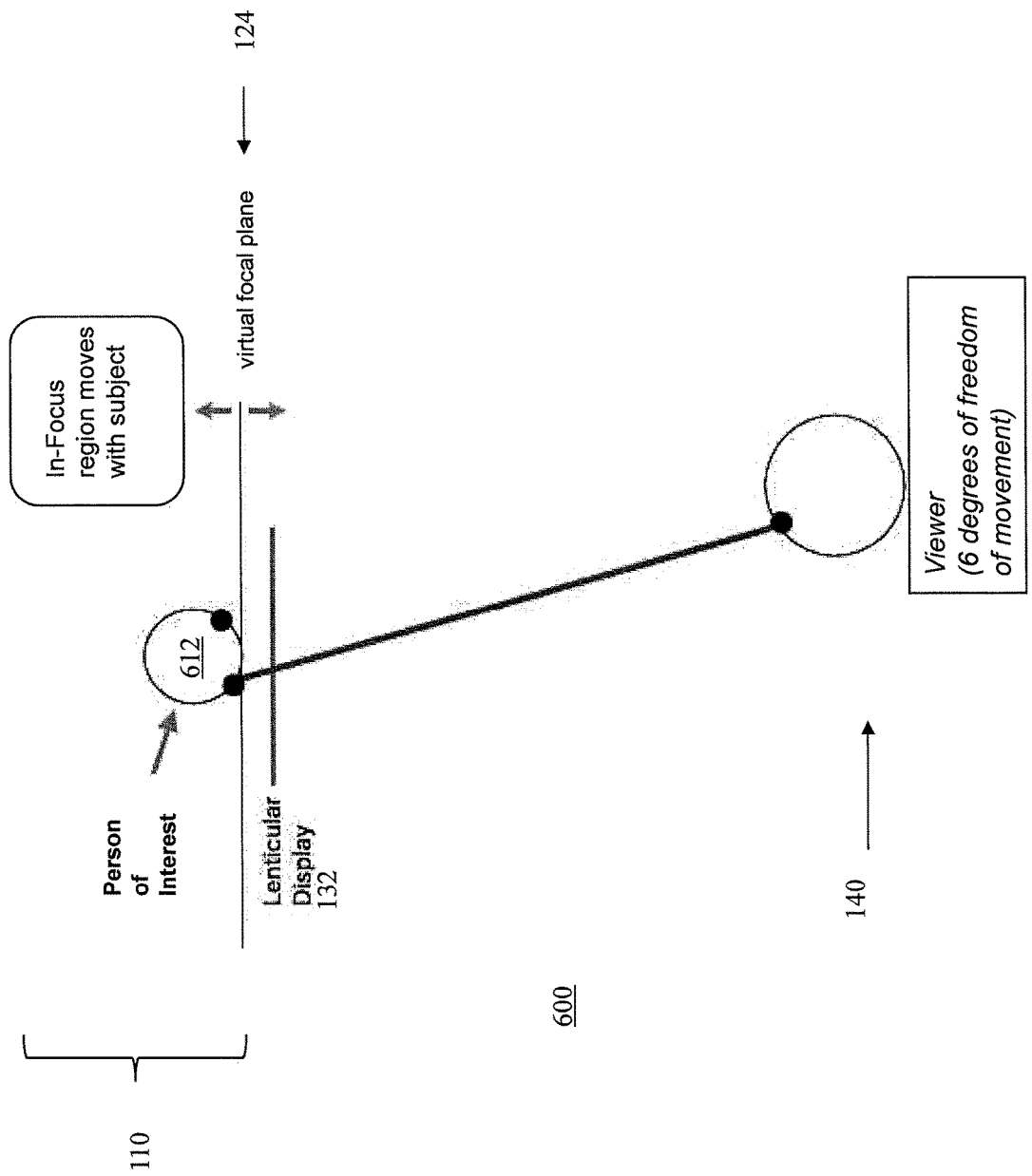
FIG. 6 illustrates an exemplary holographic real-time video communication system that provides sets of multiple images of a person from different capture positions where the images are adjusted to improve gaze direction of eyes of the person in accordance with some implementations.

FIG. 6 illustrates an exemplary holographic real-time video communication system that provides a hologram (e.g., left and right eye views that give the appearance of a 3D person) by providing a set of multiple images of a person from different capture positions where the images are adjusted to improve gaze direction of eyes of the person in accordance with some implementations. In some implementations, a set of multiple images of a person 612 are used to display a hologram video of the person 612 (e.g., object of interest) on a view dependent device such as the lenticular display 132 in a holographic real-time video communication system 600.

As shown in FIG. 6, the system 600 adjusts the images to change an appearance of a gaze direction of an eye of the person 612 in at least some of the images in the set of multiple images of the person 612. In some implementations, the images are adjusted to change the appearance of the eyes of the person in the images to appear to maintain eye contact with a viewer of the view dependent device. For example, the images may be adjusted to maintain eye contact with a viewing position of the viewer 140 of the lenticular display 132 (e.g., view dependent device). In this example, the position of the viewer of the lenticular device 132 is tracked. In some implementations, the images are adjusted to change the appearance of the eyes of the person 612 in the images to appear to have a gaze direction that corresponds to the position of the images sensors 122 (e.g., physical images sensors 122a or virtual image sensors 122b). For example, the images may be adjusted so that the gaze direction of the eye of the person 612 is directed to a prescribed portion (e.g., a center portion) of the lenticular display 132. In another example, the images may be adjusted so that the gaze direction of the eye of the person 612 more closely matches a detected gaze direction of the viewer 140 of the lenticular display 132. In this example, the gaze direction of the viewer 140 of the lenticular device 132 is tracked. In some implementations, the adjusted images are generated using machine learning techniques based on input images of the eyes (e.g., face, head, torso, etc.) and/or known spatial relationships of the holographic capturing systems and holographic playback systems (e.g., detected gaze direction and desired gaze direction). In some implementations, machine learning techniques are used to train machine learning algorithms based on input training data (e.g., synthetic, or actual) and known ground truth output data (e.g., synthetic, or actual). Portions of the system 600 (e.g., the holographic image data capture system 120 and holographic video display system 130) are not shown in FIG. 6.

Figure 7:
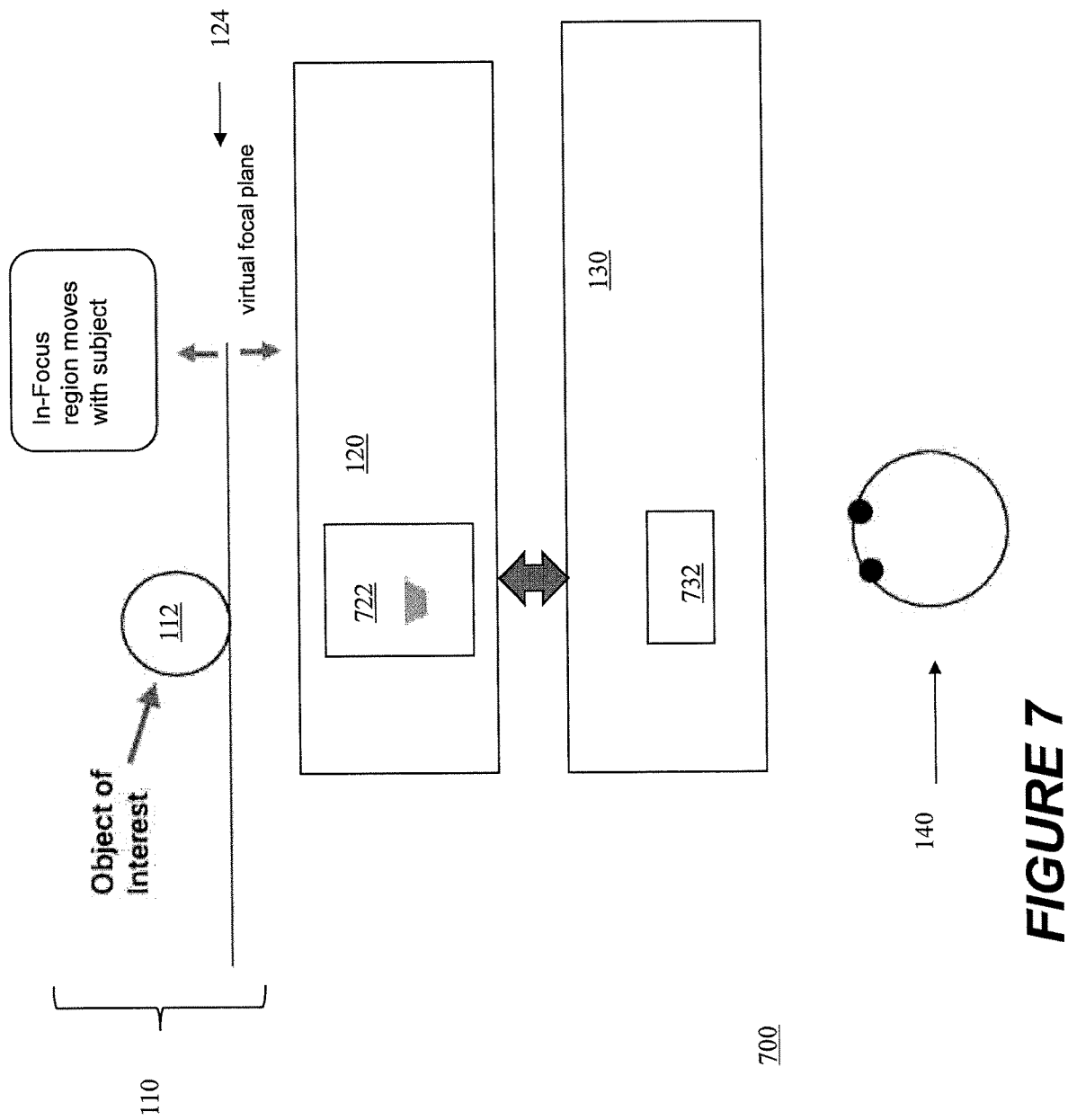
FIG. 7 illustrates an exemplary holographic real-time video communication system that provides sets of multiple images of an object from different capture positions using a single image sensor that moves over time in accordance with some implementations.

FIG. 7 illustrates an exemplary holographic real-time video communication system that provides a hologram (e.g., left and right eye views that give the appearance of a 3D object) by providing a set of multiple images of an object from different capture positions using a single image sensor that moves over time in accordance with some implementations. In some implementations, the set of multiple images of the object are used to display a 3D appearance of the object on a view dependent device (e.g., left and right eye views of the object that give the appearance of a 3D object).

As shown in FIG. 7, a holographic real-time video communication system 700 includes the holographic image data capture system 120 having a single image sensor 722 and the holographic video display system 130 having a view dependent device 732. In some implementations, the holographic real-time video communication system 700 provides real time holographic video of the object 112 to a freely moving viewer 140 (e.g., 6 degrees of freedom of movement) of the view dependent device 732.

Figure 8A:
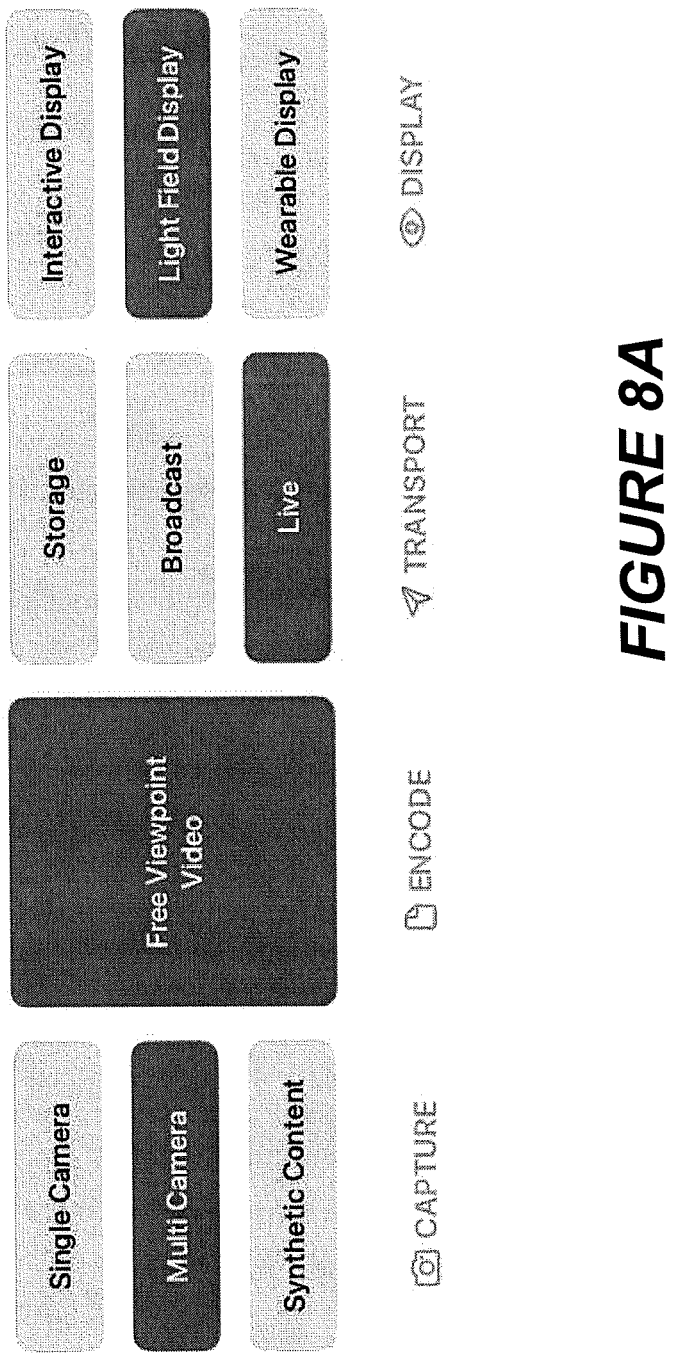
FIGS. 8A-8B are diagrams that illustrate exemplary relationships between holographic capture systems, displayable holograms, and corresponding display devices including their respective various configurations in accordance with some implementations.
Figure 8B:
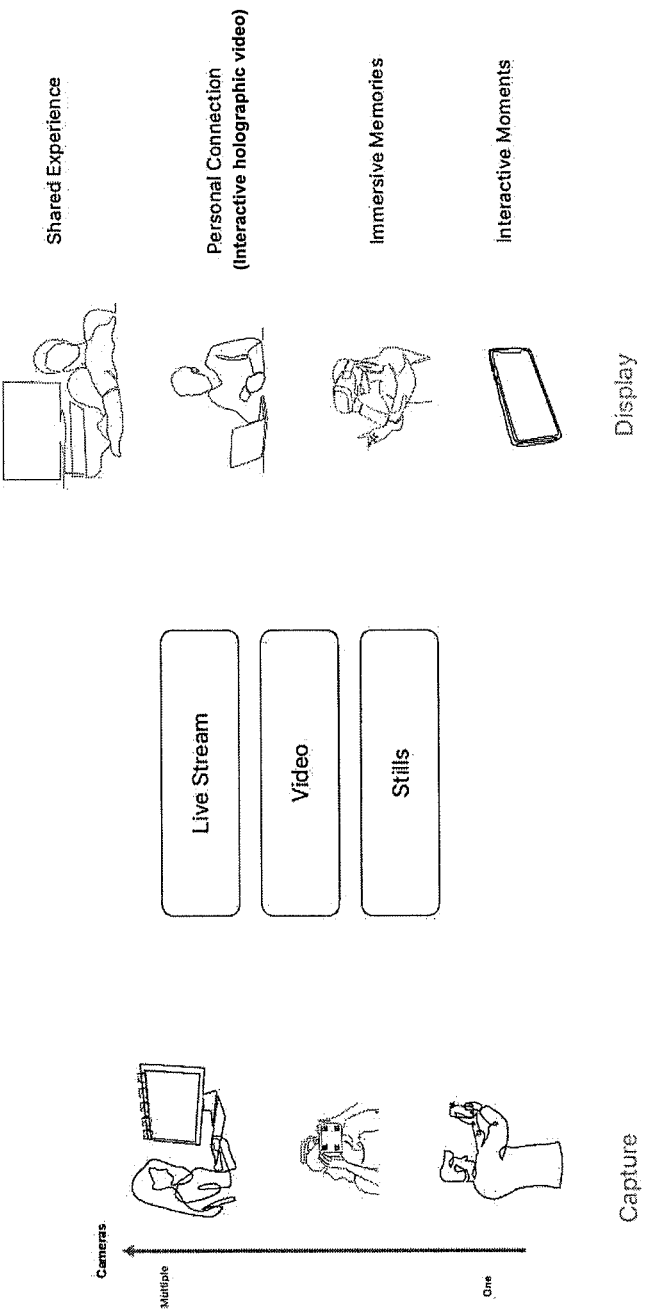

FIGS. 8A-8B are diagrams that illustrate exemplary relationships between holographic capture systems, displayable holograms, and corresponding display devices including their respective various configurations (e.g., various complexity) in accordance with some implementations. In some implementations, the capture devices are independent of the holographic display devices. In some implementations, increasingly complex capture devices are required to generate increasingly complex holographic data for live broadcast or bi-directional holographic videos, broadcast interactive video streams, or viewable interactive video holograms. For example, a capture device may include cameras, linear camera array, or 2D camera array; a viewing device may include HMD or 3D display; and an application/experience may include 1-way holographic video broadcast or 2-way holographic video interactions.

Various implementations disclosed herein include devices, systems, and methods that provide real time holographic video of an object on a view dependent device to a freely moving viewer of the view dependent device. In some implementations, a holographic real-time video communication system provides the experience of being in a holographic rendering of a physical environment with the ability of the viewer to change their viewpoint in the rendering. In some implementations, the holographic real-time video communication system provides the experience of improved or more accurate eye contact when the object is a person. In some implementations, the holographic real-time video communication system provides the experience of viewing a "digital physical object" with an improved or more accurate perception of size, shape, or materials. Further, the holographic real-time video communication system operates with a variety of conventional displays including view dependent display devices including multi-user glasses free holographic displays. In addition, the holographic real-time video communication system may operate with standard RGB cameras and reduce or eliminate depth-estimation related artifacts. In some implementations, the holographic real-time video communication system provides the ability to store, compress, or transmit holographic image data to display holographic scenes or holographic real-time video efficiently or using standard data formats.

In some implementations, the holographic real-time video communication system provides sparse video inputs with client-side view interpolation. In some implementations, the holographic real-time video communication system provides sender side or or capture-side light field enhancements leveraging video techniques such as gaze correction, background removal, etc. In some implementations, the holographic real-time video communication system provides rendering respective selective images of the plurality of concurrent images of the physical environment (e.g., object) in a right eye display and a left eye display to provide the holographic real-time video based on a viewing position in a HMD. For example, the selected images for the right eye display and the left eye display may be displayed in a portal in 6 degrees of freedom of movement HMD. In some implementations, the holographic real-time video communication system provides dynamic focus for shallow DOF lenticular displays. In some implementations, the holographic real-time video communication system provides improving out of focus display quality (e.g., blurring). In some implementations, a method includes tracking a scene, adjusting captured images based on virtual focal plane (e.g., attached to object of interest), and keeping scene features (e.g., the object) on the virtual focal plane in focus when displayed on a view dependent display based on obtained knowledge of view dependent display (e.g., lens pitch). In some implementations, the method includes capturing spatialized audio for the tracked scene.

In one implementation, a 3D display system tracks head position relative to the display and gaze direction as a pixel coordinate on the display, or an HMD device includes spatial tracking and eye tracking capabilities. In this implementation, each user (e.g., one or more) is mapped to a set of views (e.g., of a plurality of possible sets of views) that the user is currently seeing, given the position of that viewer relative to the display. This implementation enables the following capabilities: multicasting (e.g., applies to view dependent display), foveation (e.g., applies to view dependent display and HMD), autofocus (e.g., applies to view dependent display and HMD), or providing matching spatialized audio. In an example of multicasting, each user sees a different holographic video on the view dependent display device while multicasting, and when the users are wearing headphones paired to that view dependent display device, each user can receive the corresponding audio (e.g., spatialized audio, stereo audio, surround sound audio, point source audio, etc.) for their specific content. The content may be different for one or all users. In an example of foveation, foveation optimization is applied on each of the views for that user to reduce or disable expensive computations outside the foveation area such as view interpolation and gaze correction. For example, the foveation area is defined as outside a radius around the gaze hit point that maps to a constant solid angle from a viewer perspective. The radius may be an area inside the peripheral vision area. In an example of autofocus, the synthetic aperture focus is dynamically adjusted to the feature (e.g., object) matching the current gaze direction on the view dependent display device, which can also apply to one or more users. The focused views based on gaze direction may be different for one or all users.

For example, the image sensors 122 may be conventional RGB cameras because the system 100 uses image calibration instead of tracking a pose (e.g., position and orientation) of the object 112 using depth data or vision-based localization (e.g., pose estimation) such as VIO, SLAM or the like.

In some implementations, spatialized audio (e.g., stereo audio, surround sound audio, point source, etc.) is captured corresponding to each of the positions of the plurality of capture image sensors (e.g., image sensors 122) and matching spatialized audio corresponding to viewing positions of viewers (e.g., viewer 140) using a view dependent device are generated using the captured spatialized audio and a determined viewing position (e.g., to provide spatialized audio that matches the determined view). In some implementations, the capture image sensors include physical image sensors and virtual images sensors. In some implementations, the captured spatialized audio or the matching spatialized audio are encoded and then transmitted to a remote view dependent display using a prescribed format.

FIG. 9 is a flowchart illustrating an exemplary method of providing images for displaying a 3D appearance of a tracked object on a view dependent device in accordance with some implementations. In some implementations, a set of multiple images of the object from different capture positions is provided and then adjusted such as to result in the display in focus of a feature of the object (e.g., a facial feature of a person's head) on the view dependent device. In some implementations, the adjustments make the images appropriate for display on the view dependent display to provide the 3D or holographic appearance. For example, the view dependent device may include a lenticular display, a HMD, an autostereoscopic display, a light field display, or the like. In some implementations, the method 900 is performed by a device (e.g., electronic device 1220, 1200 of FIGS. 12 and 13). The method 900 can be performed using an electronic device or by multiple devices in communication with one another. In some implementations, the method 900 is performed by processing logic, including hardware, firmware, software, or a combination thereof. In some implementations, the method 900 is performed by a processor executing code stored in a non-transitory computer-readable medium (e.g., a memory). In some implementations, the method 900 is performed by an electronic device having a processor.

At block 910, the method 900 obtains images of an object. In some implementations, the images of the object are obtained by a plurality of image sensors. In some implementations, the image sensors are conventional cameras (e.g., RGB cameras). In some implementations, the image sensors include depth information. In some implementations, the images of the object are obtained by a linear array of image sensors (e.g., a 1D or 2D array of 5, 10, 20 or more cameras) at the same time. In some implementations, the images of the object are obtained by a plurality of physical image sensors and a plurality of virtual image sensors. For example, obtaining the images of the object includes generating virtual images of the object having a prescribed spatial relationship to the images of the plurality of image sensors (e.g., another plurality of intermediate images from additional virtual image sensors).

In some implementations, at block 910 the plurality of virtual image sensors include synthetic apertures based on the plurality of physical image sensors or machine learning images generated based on the plurality of physical image sensors. In one example, the plurality of virtual cameras is a 1D linear array of virtual cameras positioned between each of the 1D linear array forming the plurality of cameras. In some implementations, a first virtual focal plane for the object in the images of the plurality of image sensors is different than a second virtual focal plane for the object in the images of the plurality of virtual image sensors. In some implementations, the same single virtual focal plane is used for the object in the images of the plurality of image sensors and in the images of the plurality of virtual image sensors. In some implementations, increasing the number of concurrent obtained images of the object (e.g., additional cameras or additional virtual cameras) improve the appearance of out of focus regions (e.g., outside the 3D object appearance) on the view dependent device. In some implementations, the images of the object are obtained from a single moving image sensor.

At block 920, the method 900 tracks a feature of the object (e.g., a facial feature of a person) in the images. In some implementations, conventional computer vision techniques are used to detect and track the feature of the object. In some implementations, more than one feature of the object is tracked.

At block 930, the method 900 adjusts the images such that the feature of the object is in focus when rendered on a view dependent device. In some implementations, adjusting the images includes determining a virtual focal plane and adjusting the images based on the virtual focal plane. For example, the feature of the object is tracked in the physical environment and the virtual focal plane corresponding to the adjustment of the images captured by the plurality of image sensors is manipulated to correspond to the object in the physical environment. In other implementations, at least one image capture characteristic of each of the plurality of image sensors is adjusted based on the virtual focal plane corresponding to the feature. In one example, multiple virtual focal planes that correspond to multiple different objects being tracked in the images and in block 930, the images are adjusted using the virtual focal plane that corresponds to a selected one of the multiple tracked objects. In some implementations, a location of the virtual focal plane of the object is computed by estimating a distance from the object to the plurality of cameras. In some implementations, the adjusted images have a shifted DOF that is only limited when displayed by the limited DOF of some view dependent displays. In some implementations, at least a portion of the adjusted images outside the object is blurred. In some implementations, at least a portion of the adjusted images outside the depth of field is blurred.

At block 940, the method 900 provides the adjusted images for displaying a 3D appearance of the object on the view dependent device, where a viewing position of the view dependent device determines which of the adjusted images is viewed in a left eye view and which of the adjusted images is viewed in a right eye view. In one example, the view dependent device is a lenticular display that concurrently displays each of the adjusted images such that each eye of the viewer views a different one of the adjusted images depending upon the viewer's position. In another example, the view dependent device is a HMD that displays pixels of the adjusted images in a right eye display and pixels of the adjusted images in a left eye display of the HMD, respectively, based on a viewer pose (e.g., the viewer/HMD position).

Figure 10:
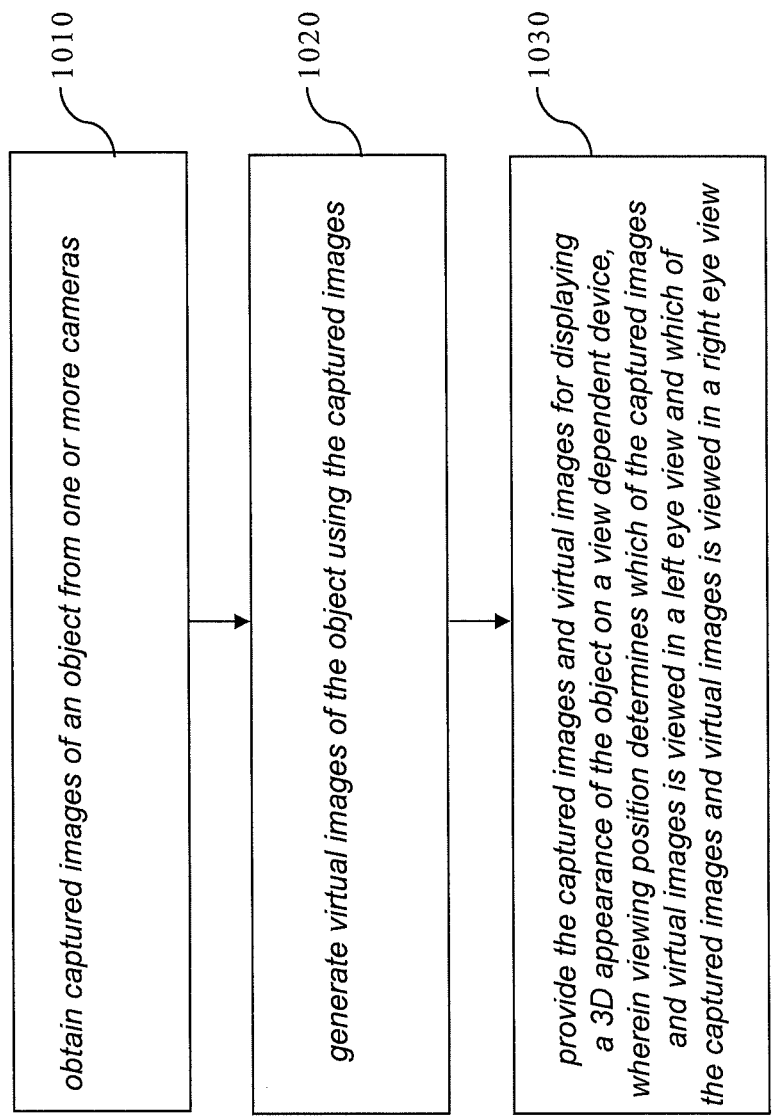
FIG. 10 is a flowchart illustrating an exemplary method of providing images for displaying a 3D appearance of a tracked object on a view dependent device in accordance with some implementations.

FIG. 10 is a flowchart illustrating an exemplary method of providing a set of multiple images of an object from different capture positions where some of the images are virtual images generated using virtual image sensors (e.g., synthetic apertures) in accordance with some implementations. In some implementations, the set of multiple images of the object are used to display a 3D appearance of the object on a view dependent device (e.g., left and right eye views of the object that give the appearance of a 3D object). In some implementations, the additional virtual images of the object from the virtual image sensors may improve the appearance, for example, in out of focus regions outside the 3D appearance of the object on the view dependent device. In some implementations, the set of multiple images of the object from different capture positions is adjusted to cause a feature of the object to be in focus when displayed on a view dependent display. In some implementations, the method 1000 is performed by a device (e.g., electronic device 1220, 1100 of FIGS. 12 and 13). The method 1000 can be performed using an electronic device or by multiple devices in communication with one another. In some implementations, the method 1000 is performed by processing logic, including hardware, firmware, software, or a combination thereof. In some implementations, the method 1000 is performed by a processor executing code stored in a non-transitory computer-readable medium (e.g., a memory). In some implementations, the method 1000 is performed by an electronic device having a processor.

At block 1010, the method 1000 obtains captured images of an object. In some implementations, the captured images of the object are obtained by a plurality of image sensors. In some implementations, the captured images of the object include images captured concurrently from a linear array of a plurality of image sensors. In some implementations, the image sensors are conventional cameras (e.g., RGB cameras). In some implementations, the images of the object are obtained by a linear array of image sensors (e.g., a 1D or 2D array of 5, 10, 20 or more cameras) at the same time. In some implementations, at block 1010 the captured images of the object are obtained from a single moving image sensor.

At block 1020, the method 1000 generates virtual images of the object using the captured images. In some implementations, generating the virtual images of the object uses the captured images to generate additional virtual images of the object based on the captured images from physical image sensors. In some implementations, generating the virtual images of the object includes generating a plurality of virtual image sensors that have a prescribed spatial relationship to a plurality of image sensors that generated the captured images of the object. For example, the captured images of the object may be from a 1D array of image sensors and the generated virtual images of the object are a plurality of intermediate images from a 1D array of virtual image sensors between the 1D array of image sensors. In some implementations, the virtual images of the object are generated at the same time from the plurality of virtual cameras. In some implementations, the plurality of virtual cameras are synthetic apertures. In one example, the synthetic apertures are based on image processing of data of the plurality of physical image sensors. In another example, the synthetic apertures are based on machine learning image generation based on trained neural networks inputting data from the plurality of physical image sensors. In some implementations, the virtual images are directly generated based on a required focal plane (e.g., that tracks a feature of the moving object 112). For example, the virtual images can only be generated knowing the desired focal plane already, and can be constantly re-generated in real-time based on that knowledge (e.g., captured image data from the physical image sensors). In some implementations, the captured image data is adjusted to bring different depth planes into focus when pixels of the captured and the virtual images are respectively displayed in left and right eye displays on the view dependent device.

At block 1030, the method 1000 provides the captured images and virtual images to display a three-dimensional (3D) appearance of the object on a view dependent device, wherein viewing position determines which of the captured images and virtual images is viewed in a left eye view and which of the captured images and virtual images is viewed in a right eye view. In one example, the view dependent device is a lenticular display that concurrently displays each of the captured images and virtual images such that each eye of the viewer views a different one of the captured images and virtual images depending upon the viewer's position. In another example, the view dependent device is a HMD that displays pixels of the adjusted images in a right eye display and pixels of the adjusted images in a left eye display of the HMD, respectively, based on a viewer pose (e.g., the viewer/HMD position).

In some implementations, the captured images and generated virtual images are adjusted in a similar manner as the "obtained images of the object" in blocks 920-930 as described with respect to FIG. 9. The adjusted captured images and virtual images make them appropriate for display on the view dependent display to provide the 3D or holographic appearance of the object. In some implementations, the virtual focal plane of virtual images may differ from that of the captured images and may improve the appearance of out of focus regions (e.g., outside the 3D object appearance) on the view dependent device (e.g., modify blurring).

In some implementations, view dependent devices include HMDs, an autostereoscopic display, a light field display, multi-user glasses free holographic displays, or the like. In some implementations, multiple different objects are in the captured images and in block 1030, the captured images and virtual images are provided for a selected one of the multiple objects.

Figure 11:
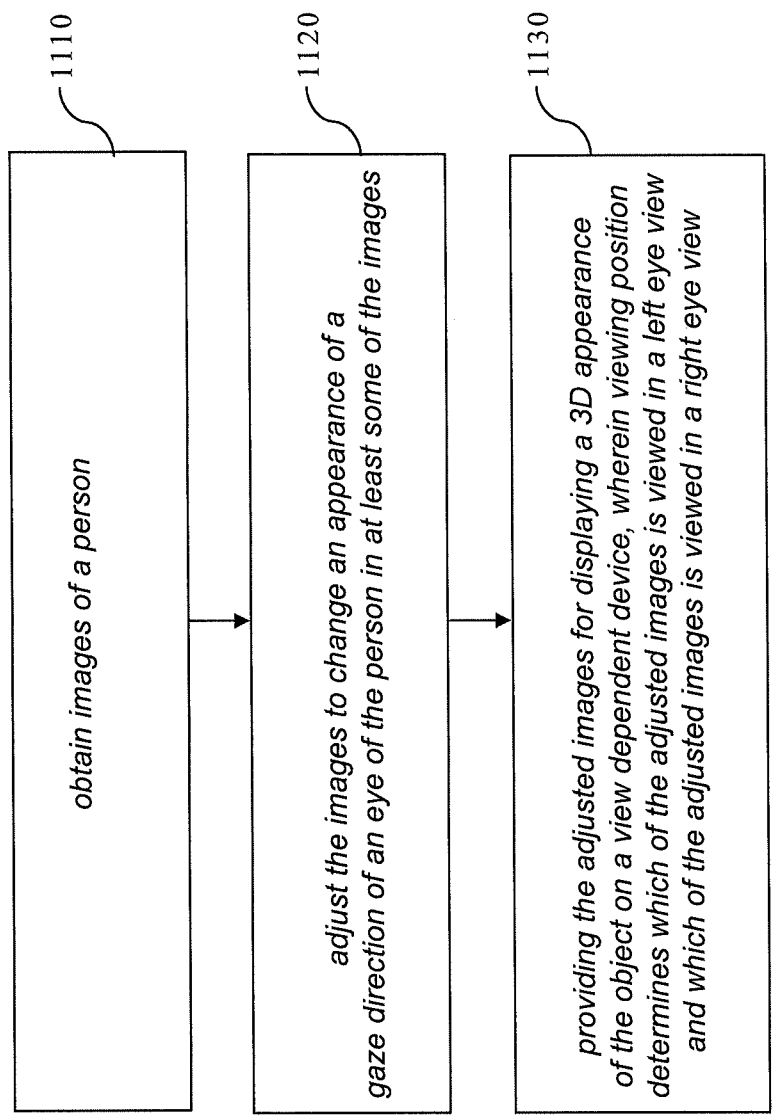
FIG. 11 is a flowchart illustrating an exemplary method of providing images for displaying a 3D appearance of a tracked object on a view dependent device in accordance with some implementations.

FIG. 11 is a flowchart illustrating an exemplary method of providing a hologram (e.g., left and right eye views that give the appearance of a 3D person) by providing a set of multiple images of a person from different capture positions where the images are adjusted to improve gaze direction of eyes of the person in accordance with some implementations. In some implementations, the set of multiple images of the person are used to display a hologram video of the person on a view dependent device (e.g., left and right eye views of the person). In some implementations, the set of multiple images of the person are adjusted to focus on a facial feature of the person. In some implementations, the method 1100 is performed by a device (e.g., electronic device 1220, 1200 of FIGS. 12 and 13). The method 1100 can be performed using an electronic device or by multiple devices in communication with one another. In some implementations, the method 1100 is performed by processing logic, including hardware, firmware, software, or a combination thereof. In some implementations, the method 1100 is performed by a processor executing code stored in a non-transitory computer-readable medium (e.g., a memory). In some implementations, the method 1100 is performed by an electronic device having a processor.

At block 1110, the method 1100 obtains images of a person from different capture positions. In some implementations, the images of the person are obtained by a plurality of image sensors. In some implementations, the image sensors are conventional cameras (e.g., RGB cameras). In some implementations, the images of the object are obtained by a linear array of image sensors (e.g., a 1D or 2D array of 5, 10, 20 or more cameras) at the same time. In some implementations, obtaining the images of the person includes generating virtual images of the person having a prescribed spatial relationship to the images of a plurality of physical image sensors (e.g., images from a plurality of virtual image sensors). In some implementations, block 1110 operates in a similar manner to block 910 described herein with respect to FIG. 9.

At block 1120, the method 1100 adjusts the images to change an appearance of a gaze direction of an eye of the person in at least some of the images. In some implementations, the images are adjusted to change the appearance of the eyes of the person in the images to appear to maintain eye contact with a viewer of the view dependent device. For example, the images may be adjusted to maintain eye contact with a viewing position of a viewer of the view dependent device. For example, the images are adjusted to change the appearance of the eyes of the person in the images to appear to have a gaze direction that corresponds to the position of the physical image sensors or the virtual image sensors. In some implementations, the images may be adjusted so that the gaze direction of the eye of the person is directed to a prescribed portion of the view dependent device. In some implementations, the prescribed portion of the view dependent device is a center portion of the view dependent device. In some implementations, the prescribed portion of the view dependent device is a detected gaze direction of a viewer of the view dependent device at the view dependent device. In some implementations, gaze tracking uses one or both eyes of a person.

At block 1130, the method 1100 provides the adjusted images for displaying a 3D appearance of the person on a view dependent device, wherein viewing position determines which of the adjusted images is viewed in a left eye view and which of the adjusted images is viewed in a right eye view. In one example, the view dependent device is a lenticular display that concurrently displays each of the adjusted images such that each eye of the viewer views a different one of the adjusted images depending upon the viewer's position. In another example, the view dependent device is a HMD that displays pixels of the adjusted images in a right eye display and pixels of the adjusted images in a left eye display of the HMD, respectively, based on a viewer pose (e.g., the viewer/HMD position).

In some implementations, the adjusted images of the person in block 1130 are further modified in a similar manner as the "obtained images of the object" in blocks 920-930 as described with respect to FIG. 9. The adjusted images further modified as described in blocks 920-930 make them appropriate for display on the view dependent display to provide the 3D or holographic appearance. In some implementations, the virtual focal plane of virtual images may differ from that chosen for the captured images to further improve the appearance of out of focus regions (e.g., outside the displayed 3D appearance of the person) on the view dependent device.

In some implementations, multiple different people are in the images and in block 1130, the images provided to the view dependent device for a selected one of the multiple people. In some implementations, a DOF of the capture image sensors (e.g., image sensors 122) is sufficient so that locating the virtual focal plane at the eyes of a person ensures that the entire face of the person remains in focus when display on the view dependent display.

Figure 12:
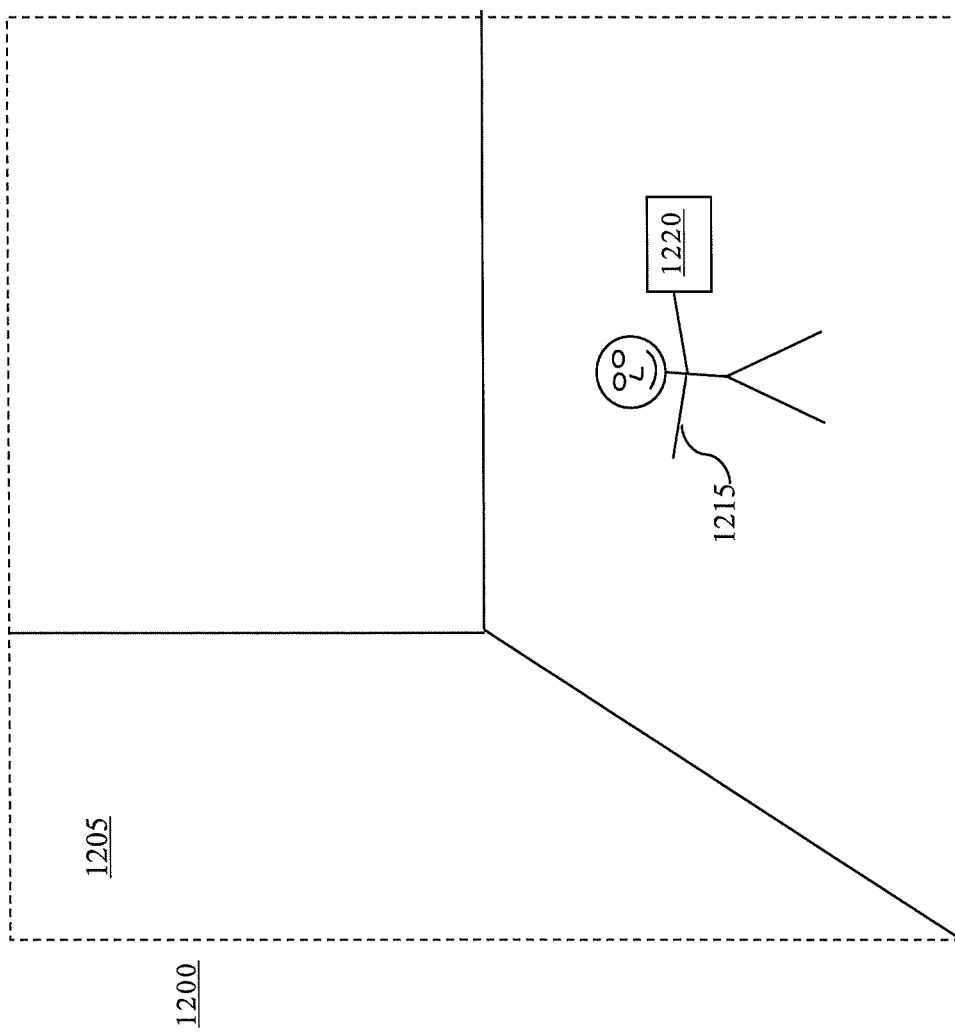
FIG. 12 illustrates an example operating environment in accordance with some implementations.

FIG. 12 illustrates an example operating environment 1200 in which electronic device 1220 is used in physical environment 1205. A physical environment refers to a physical world that people can interact with and/or sense without the aid of electronic systems. Physical environments, such as a physical park, include physical articles, such as physical trees, physical buildings, and physical people. People can directly sense and/or interact with the physical environment, such as through sight, touch, hearing, taste, and smell.

In the example of FIG. 12, the device 1220 is illustrated as a single device. Some implementations of the device 1220 are hand-held. For example, the device 1220 may be a mobile phone, a tablet, a laptop, and so forth. In some implementations, the device 1220 is worn by a user 1215. For example, the device 1220 may be a watch, a head-mounted device (HMD), and so forth. In some implementations, functions of the device 1220 are accomplished via two or more devices, for example additionally including an optional base station. Other examples include a laptop, desktop, server, or other such device that includes additional capabilities in terms of power, CPU capabilities, GPU capabilities, storage capabilities, memory capabilities, and the like. The multiple devices that may be used to accomplish the functions of the device 1220 may communicate with one another via wired or wireless communications.

Figure 13:
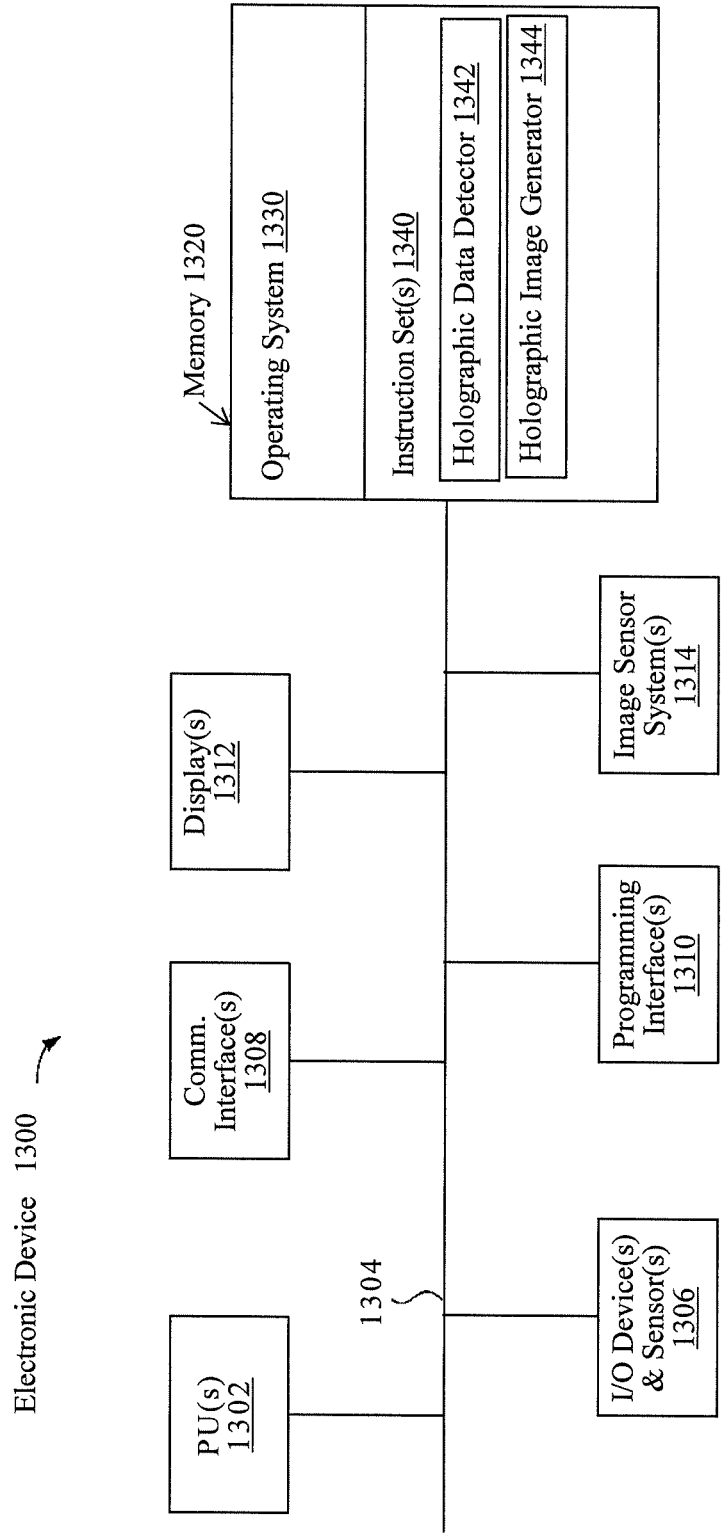
FIG. 13 illustrates an example electronic device in accordance with some implementations.

FIG. 13 is a block diagram of an example device 1300. Device 1300 illustrates an exemplary device configuration for the device 1220. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 1300 includes one or more processing units 1302 (e.g., microprocessors, ASICs, FPGAs, GPUs, CPUs, processing cores, or the like), one or more input/output (I/O) devices and sensors 1306, one or more communication interfaces 1308 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, or the like type interface), one or more programming (e.g., I/O) interfaces 1310, one or more displays 1312, one or more interior or exterior facing sensor systems 1314, a memory 1320, and one or more communication buses 1304 for interconnecting these and various other components.

In some implementations, the one or more communication buses 1304 include circuitry that interconnects and controls communications between system components. In some implementations, the one or more I/O devices and sensors 1306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 1312 are configured to present content to the user. In some implementations, the one or more displays 1312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays 1312 correspond to diffractive, reflective, polarized, holographic, etc. waveguide displays. For example, the electronic device 1300 may include a single display. In another example, the electronic device 1300 includes a display for each eye of the user.

In some implementations, the one or more interior or exterior facing sensor systems 1314 include an image capture device or array that captures image data or an audio capture device or array (e.g., microphone) that captures audio data. The one or more image sensor systems 1314 may include one or more RGB cameras (e.g., with a complimentary metal-oxide-semiconductor (CMOS) image sensor or a charge-coupled device (CCD) image sensor), monochrome cameras, IR cameras, or the like. In various implementations, the one or more image sensor systems 1314 further include an illumination source that emits light such as a flash. In some implementations, the one or more image sensor systems 1314 further include an on-camera image signal processor (ISP) configured to execute a plurality of processing operations on the image data.

The memory 1320 includes high-speed random-access memory, such as DRAM, SRAM, DDR RAM, or other random-access solid-state memory devices. In some implementations, the memory 1320 includes non-volatile memory, such as one or more magnetic disk storage devices, optical disk storage devices, flash memory devices, or other non-volatile solid-state storage devices. The memory 1320 optionally includes one or more storage devices remotely located from the one or more processing units 1302. The memory 1320 comprises a non-transitory computer readable storage medium.

In some implementations, the memory 1320 or the non-transitory computer readable storage medium of the memory 1320 stores an optional operating system 1330 and one or more instruction set(s) 1340. The operating system 1330 includes procedures for handling various basic system services and for performing hardware dependent tasks. In some implementations, the instruction set(s) 1340 include executable software defined by binary information stored in the form of electrical charge. In some implementations, the instruction set(s) 1340 are software that is executable by the one or more processing units 1302 to carry out one or more of the techniques described herein.

In some implementations, the instruction set(s) 1340 include a holographic data detector 1342 that is executable by the processing unit(s) 1302 to capture image sensor data representing a holographic image data for a physical environment according to one or more of the techniques disclosed herein.

In some implementations, the instruction set(s) 1340 include a holographic image generator 1344 that is executable by the processing unit(s) 1302 to generate images for display on a view dependent device to render a holographic appearance of an object in the physical environment based on a viewing position for the view dependent device according to one or more of the techniques disclosed herein.

Although the instruction set(s) 1340 are shown as residing on a single device, it should be understood that in other implementations, any combination of the elements may be located in separate computing devices. FIG. 13 is intended more as a functional description of the various features which are present in a particular implementation as opposed to a structural schematic of the implementations described herein. As recognized by those of ordinary skill in the art, items shown separately could be combined and some items could be separated. For example, actual number of instruction sets and the division of particular functions and how features are allocated among them will vary from one implementation to another and, in some implementations, depends in part on the particular combination of hardware, software, or firmware chosen for a particular implementation.

In some implementations, the electronic device 1300 is a head mounted system including one or more speaker(s) and an integrated opaque display. Alternatively, the head mounted system may be configured to accept an external opaque display (e.g., a smartphone). Rather than an opaque display, the head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 14:
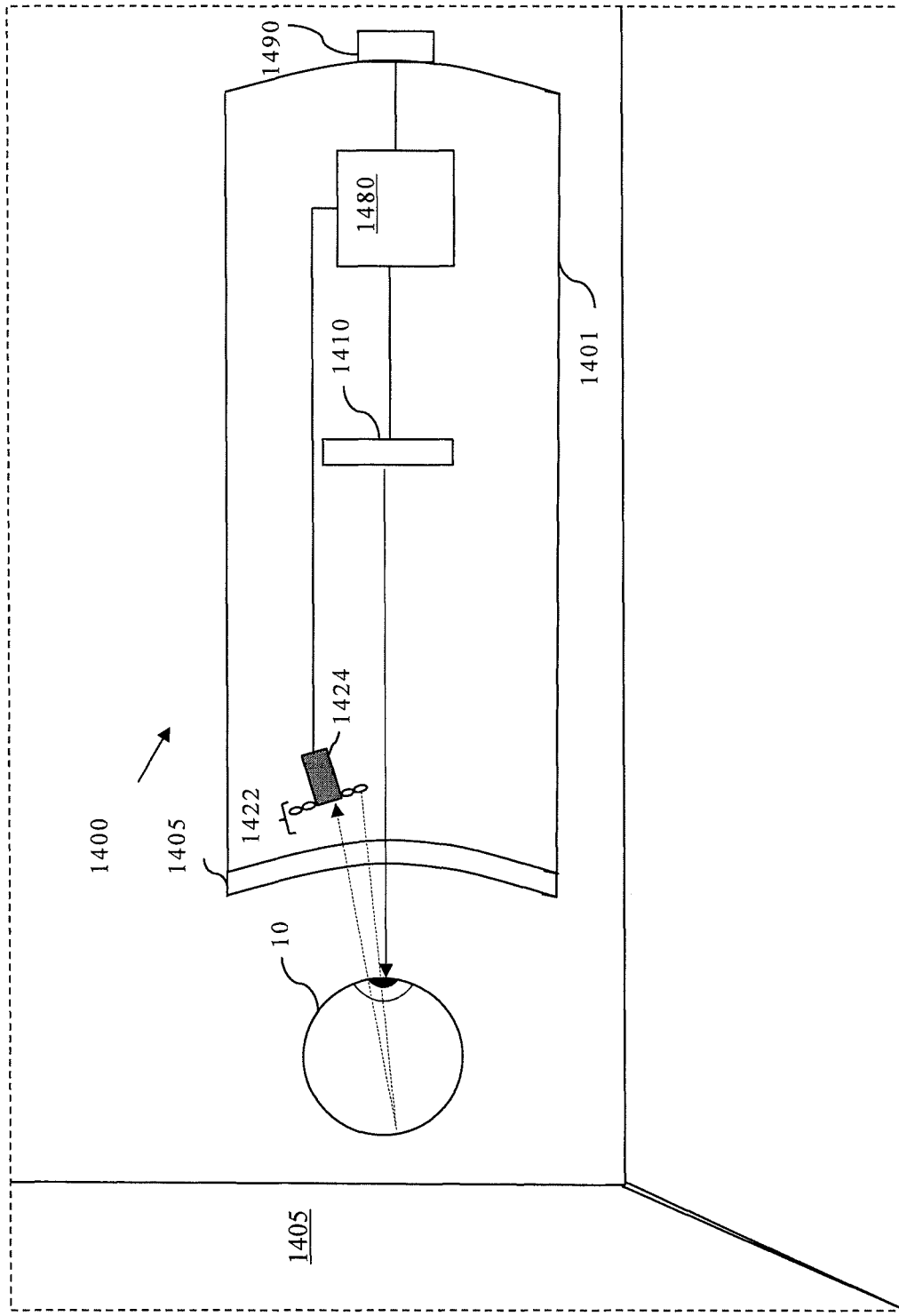
FIG. 14 illustrates an exemplary head mounted device (HMD) in accordance with some implementations.

FIG. 14 illustrates a block diagram of an HMD 1400 in accordance with some implementations. The head-mounted device 1400 includes a housing 1401 (or enclosure) that houses various components of the head-mounted device 1400. The housing 1401 includes (or is coupled to) an eye pad 1405 disposed at a proximal (to the user 10) end of the housing 1401. In various implementations, the eye pad 1405 is a plastic or rubber piece that comfortably and snugly keeps the head-mounted device 1400 in the proper position on the face of the user 10 (e.g., surrounding the eye of the user 10).

The housing 1401 houses a display 1410 that displays an image, emitting light towards onto the eye of a user 10. In various implementations, the display 1410 emits the light through an eyepiece (not shown) that refracts the light emitted by the display 1410, making the display appear to the user 10 to be at a virtual distance farther than the actual distance from the eye to the display 1410. For the user to be able to focus on the display 1410, in various implementations, the virtual distance is at least greater than a minimum focal distance of the eye (e.g., 7 cm). Further, in order to provide a better user experience, in various implementations, the virtual distance is greater than 1 meter.

Although FIG. 14 illustrates a head-mounted device 1400 including a display 1410 and an eye pad 1405, in various implementations, the head-mounted device 1400 does not include a display 1410 or includes an optical see-through display without including an eye pad 1405.

The housing 1401 also houses a pupil assessment system including one or more light sources 1422, image sensor 1424, and a controller 1480. The one or more light sources 1422 emit light towards the eye of the user 10 that reflects light (e.g., a directional beam) that can be detected by the sensor 1424. Based on the reflections, the controller 1480 can determine pupil characteristics of the user 10. As another example, the controller 1480 can determine a pupil center, a pupil size, gaze direction, or a point of regard. Thus, in various implementations, the light is emitted by the one or more light sources 1422, reflects off the eye of the user 10, and is detected by the sensor 1424. In various implementations, the light from the eye of the user 10 is reflected off a hot mirror or passed through an eyepiece before reaching the sensor 1424.

The display 1410 may emit light in a first wavelength range and the one or more light sources 1422 may emit light in a second wavelength range. Similarly, the sensor 1424 may detect light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In some implementations, the one or more other light sources (not shown) emit light towards the eye of the user which reflects in the form of one or more glints off the surface of the eye.

In various implementations, the sensor 1424 is a frame/shutter-based camera that, at a particular point in time or multiple points in time at a frame rate, generates an image of the eye of the user 10. Each image includes a matrix of pixel values corresponding to pixels of the image which correspond to locations of a matrix of light sensors of the camera.

In various implementations, pupil characteristic assessment is used to facilitate gaze tracking, which may be used to enable user interaction (e.g., the user 10 selects an option on the display 1410 by looking at it), provide foveated rendering (e.g., present a higher resolution in an area of the display 1410 the user 10 is looking at and a lower resolution elsewhere on the display 1410), or reduce geometric distortion (e.g., in 3D rendering of objects on the display 1410).

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a processor:
   obtaining, from one or more image sensors, a sequence of images of an object;
   tracking a user feature of interest of the object in the sequence of images;
   after said tracking and during rendering on a view dependent device, adjusting the sequence of images such that the user feature of interest of the object is aligned on a virtual focal plane in the adjusted images during said rendering, wherein alignment of the user feature of interest results in the user feature of interest being rendered in focus on the view dependent device; and
   providing the adjusted images for displaying a three-dimensional (3D) appearance of the object on the view dependent device, wherein viewing position determines which of the adjusted images is viewed in a left eye view and which of the adjusted images is viewed in a right eye view.

2. The method of claim 1, wherein said adjusting the sequence of images comprises tracking the virtual focal plane for the feature of interest of the object in the sequence of images.

3. The method of claim 1, wherein said adjusting the sequence of images comprises tracking multiple virtual focal planes for multiple tracked objects in the sequence of images and adjusting the sequence of images based on a corresponding virtual focal plane for a selected one of the multiple tracked objects.

4. The method of claim 1, wherein said obtaining the sequence of images of the object comprises concurrently obtaining the sequence of images from the one or more image sensors, where a location of the virtual focal plane of the object is computed by estimating a distance from the object to the one or more image sensors.

5. The method of claim 1, wherein the one or more image sensors comprise a plurality of virtual cameras, and wherein said obtaining the sequence of images of the object comprises concurrently obtaining the sequence of images from the plurality of virtual cameras.

6. The method of claim 5, wherein said adjusting the sequence of images comprises tracking the virtual focal plane for the object in the sequence of.

7. The method of claim 5, wherein each of the plurality of virtual cameras are spatially posed based on poses of the plurality of virtual cameras, and wherein the plurality of virtual cameras comprises synthetic apertures based on the plurality of virtual cameras or machine learning image generation based on the plurality of virtual cameras.

8. The method of claim 5, wherein a first depth of field for the plurality of virtual cameras is different than a second depth of field for the plurality of virtual cameras and each include a first focal plane corresponding to the tracked feature of interest of the object.

9. The method of claim 1, wherein the view dependent device comprises a 1D lenticular display that allows parallax in a first direction, wherein the 1D lenticular display concurrently displays each of the adjusted images such that each eye of the viewer views a different one of the adjusted images depending upon the viewer's position along the first direction.

10. The method of claim 1, wherein the view dependent device comprises a head-mounted display (HMD) that displays pixels of multiple adjusted images in a right eye display and displays pixels of two or more adjusted images in a left eye display of the HMD, respectively, based on a viewer pose.

11. The method of claim 1, wherein the view dependent device comprises a HMD, an autostereoscopic display, or a light field display, and wherein the adjusted images are encoded and then transmitted to the view dependent display using a prescribed video format.

12. The method of claim 1, wherein the view dependent device is a light field display, further comprising displaying the adjusted images in the light field display causes a single focal plane to be in focus on the light field display.

13. The method of claim 12, wherein the light field display comprises a limited depth of field that includes the single focal plane, further comprising:
   capturing spatialized audio corresponding to each of the obtained images; and
   providing adjusted spatialized audio corresponding to the viewing position based on the captured spatialized audio.

14. The method of claim 1, wherein the one or more image sensors comprises a single moving camera.

15. The method of claim 1, further comprising:
   capturing spatialized audio corresponding to each of the obtained images; and
   providing adjusted spatialized audio corresponding to the viewing position based on the captured spatialized audio.

16. A system comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the system to perform operations comprising:
   obtaining, from one or more image sensors, a sequence of images of an object;
   tracking a user feature of interest of the object in the sequence of images;
   after said tracking and during rendering on a view dependent device, adjusting the sequence of images such that the user feature of interest of the object is aligned on a virtual focal plane in the adjusted images during said rendering, wherein alignment of the user feature of interest results in the user feature of interest being rendered in focus on the view dependent device; and providing the adjusted images for displaying a three-dimensional (3D) appearance of the object on the view dependent device, wherein viewing position determines which of the adjusted images is viewed in a left eye view and which of the adjusted images is viewed in a right eye view.

17. The system of claim 16, wherein said adjusting the sequence of images comprises tracking the virtual focal plane for the feature of interest of the object in the sequence of images.

18. The system of claim 16, wherein said adjusting the sequence of images comprises tracking multiple virtual focal planes for multiple tracked objects in the sequence of images and adjusting the sequence of images based on a corresponding virtual focal plane for a selected one of the multiple tracked objects.

19. A non-transitory computer-readable storage medium, storing program instructions computer-executable on a computer to perform operations comprising:

obtaining, from one or more image sensors, a sequence of images of an object;

tracking a user feature of interest of the object in the sequence of images;

after said tracking and during rendering on a view dependent device, adjusting the sequence of images such that the user feature of interest of the object is aligned on a virtual focal plane in the adjusted images during said rendering, wherein alignment of the user feature of interest results in the user feature of interest being rendered in focus on the view dependent device; and providing the adjusted images for displaying a three-dimensional (3D) appearance of the object on the view dependent device, wherein viewing position determines which of the adjusted images is viewed in a left eye view and which of the adjusted images is viewed in a right eye view.

20. The method of claim 1, wherein the virtual focal plane is determined by computing a depth from the sequence of images to the user feature of interest of the object.

* * * * *